United States Patent
Makiuchi et al.

(10) Patent No.: US 10,976,884 B2
(45) Date of Patent: Apr. 13, 2021

(54) TOUCH PANEL (71) Applicant: FUJITSU COMPONENT LIMITED, Tokyo (JP)

(72) Inventors: Yuji Makiuchi, Tokyo (JP); Satoshi Sakurai, Tokyo (JP); Shozo Furukawa, Tokyo (JP); Hideyuki Hagihara, Tokyo (JP); Takuya Ozawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/387,701

(22) Filed: Apr. 18, 2019

(65) Prior Publication Data
US 2019/0324579 A1    Oct. 24, 2019

(30) Foreign Application Priority Data

Apr. 23, 2018 (JP) .............................. JP2018-082068

(51) Int. Cl.
*G06F 3/045* (2006.01)
*G06F 3/047* (2006.01)

(52) U.S. Cl.
CPC .............. *G06F 3/045* (2013.01); *G06F 3/047* (2013.01)

(58) Field of Classification Search
CPC ................................. G06F 3/045; G06F 3/047
See application file for complete search history.

(56) References Cited

U.S. PATENT DOCUMENTS

| | | | |
|---|---|---|---|
| 10,128,271 B2 * | 11/2018 | Kimura | G06F 3/04166 |
| 2010/0033442 A1 * | 2/2010 | Kusuda | G06F 3/041 |
| | | | 345/173 |
| 2012/0098551 A1 * | 4/2012 | Tsukamoto | G06F 3/045 |
| | | | 324/658 |
| 2013/0155059 A1 * | 6/2013 | Wang | G06F 3/0447 |
| | | | 345/419 |
| 2013/0342226 A1 * | 12/2013 | Wang | G06F 3/0443 |
| | | | 324/691 |
| 2014/0320746 A1 * | 10/2014 | Sato | G06F 1/1656 |
| | | | 348/725 |
| 2015/0199054 A1 * | 7/2015 | Kikuchi | G06F 3/045 |
| | | | 345/174 |
| 2015/0324056 A1 * | 11/2015 | Sato | G06F 1/1626 |
| | | | 345/174 |
| 2016/0188042 A1 * | 6/2016 | Tomita | G06F 3/045 |
| | | | 345/174 |
| 2017/0263998 A1 * | 9/2017 | Park | H01Q 1/50 |
| 2018/0252955 A1 * | 9/2018 | Kurasawa | G02F 1/13338 |

FOREIGN PATENT DOCUMENTS

JP    H09-231007    9/1997

* cited by examiner

*Primary Examiner* — Ibrahim A Khan
(74) *Attorney, Agent, or Firm* — IPUSA, PLLC (57) ABSTRACT

A touch panel includes a first substrate, a second substrate disposed facing the first substrate, a first conductive layer formed on one surface of the first substrate, a second conductive layer formed on a surface of the second substrate that faces the first substrate, an insulating layer disposed between the first conductive layer and the second conductive layer, and a decorative layer disposed between the first conductive layer and the insulating layer. The decorative layer is electrically conductive and is disposed along an outer periphery of the first substrate. The insulating layer has a through-hole that extends from the decorative layer to the second conductive layer.

4 Claims, 8 Drawing Sheets

TOUCH PANEL

CROSS-REFERENCE TO RELATED APPLICATIONS

The present application is based on and claims priority to Japanese patent application No. 2018-082068 filed on Apr. 23, 2018, with the Japanese Patent Office, the entire contents of which are hereby incorporated by reference.

BACKGROUND OF THE INVENTION

1. Field of the Invention

The disclosures herein relate to a touch panel.

2. Description of the Related Art

Conventionally, resistive touch panels having a decorative layer formed between an upper substrate and a lower substrate to conceal wiring and to improve the appearance of the touch panel are known (Patent Document 1, for example). With the above structure, the decorative layer is not required to be formed on the surface of the touch panel. Thus, an operation surface can be made smooth and the appearance of the touch panel is improved.

When a touch panel is operated by fingers with static electricity, the static electricity may be discharged inside the touch panel. In such a case, a drive circuit or the touch panel may be damaged by the electrostatic discharge. Patent Document 1 describes a touch panel that includes holes penetrating an outer frame such that damage from electrostatic discharge can be reduced.

In Patent Document 1, a decorative layer is provided between an upper electrode layer and wiring. Thus, the decorative layer needs to be formed of a conductive material to conductively connect the upper electrode layer and the wiring. However, because the decorative layer is formed in a frame shape along the outer periphery of the panel, static electricity may enter through the decorative layer and may be discharged inside the touch panel.

RELATED-ART DOCUMENTS

Patent Documents

[Patent Document 1] Japanese Laid-open Patent Publication No. 9-231007

SUMMARY

It is a general object of an embodiment of the present invention to provide a touch panel that reduces an effect of electrostatic discharge.

According to at least one embodiment, a touch panel includes a first substrate, a second substrate disposed facing the first substrate, a first conductive layer formed on one surface of the first substrate, a second conductive layer formed on a surface of the second substrate that faces the first substrate, an insulating layer disposed between the first conductive layer and the second conductive layer, and a decorative layer disposed between the first conductive layer and the insulating layer. The decorative layer is electrically conductive and is disposed along an outer periphery of the first substrate. The insulating layer has a through-hole that extends from the decorative layer to the second conductive layer.

DESCRIPTION OF THE EMBODIMENTS

According to at least one embodiment, a touch panel that reduces an effect of electrostatic discharge is provided.

In the following, embodiments of the present invention will be described with reference to the accompanying drawings. In order to facilitate understanding of the description, the same elements are denoted by the same reference numerals in the drawings, and a duplicate description thereof will be omitted.

First Embodiment

Figure 1:
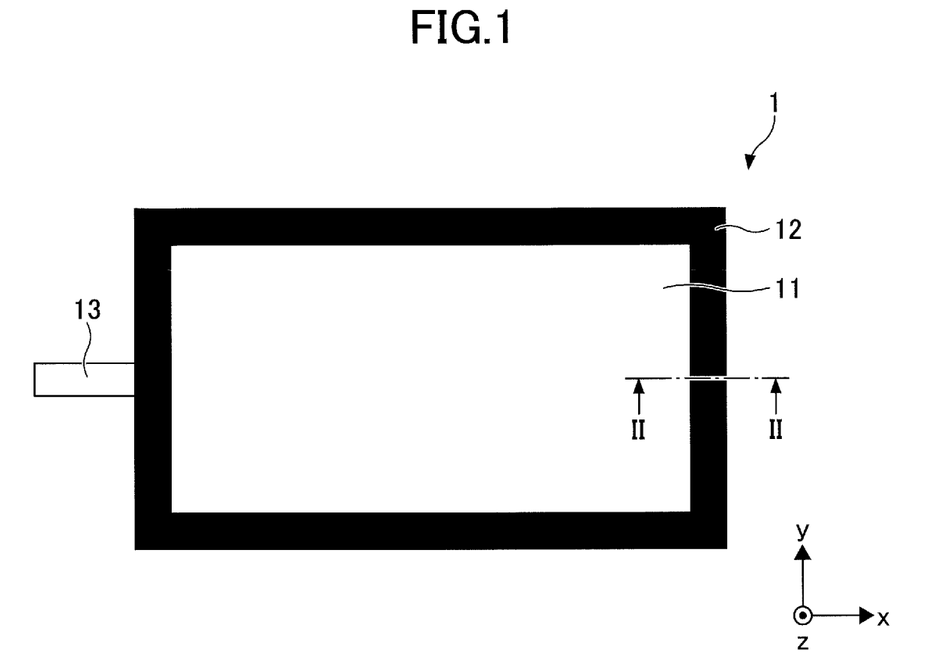
FIG. 1 is a plan view of a touch panel according to a first embodiment.
Figure 2:
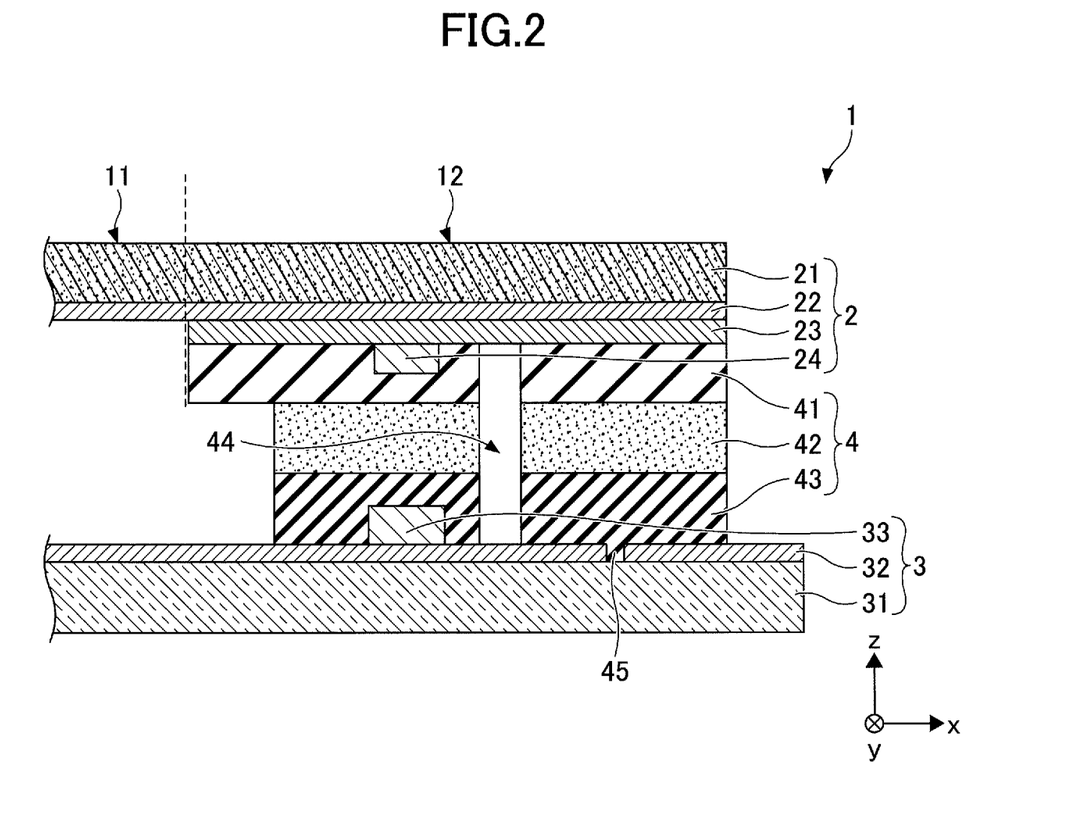
FIG. 2 is a cross-sectional view taken through II-II of the touch panel.

A first embodiment will be described with reference to FIG. 1 through FIG. 3B. FIG. 1 is a plan view of a touch panel 1 according to the first embodiment. FIG. 2 is a cross-sectional view taken through II-II of the touch panel 1 illustrated in FIG. 1. In the drawings, the x-direction, the y-direction, and the z-direction are perpendicular to each other. The z-direction is a thickness direction of components of the touch panel 1. A +z side is referred to as an upper side and an −z side is referred to as a lower side. In the touch panel 1, the x-direction and the y-direction are each a horizontal direction, with the longer side being in the x-direction and the shorter side being in the y-direction.

The touch panel 1 is a resistive touch panel that includes an upper electrode layer having a transparent conductive layer and a lower electrode layer having a transparent conductive layer. The upper electrode layer and the lower electrode layer are disposed such that the transparent conductive layers face each other. The resistive touch panel detects a position at which the transparent conductive layers contact each other when force is applied on the upper electrode layer. The touch panel 1 may be any type of resistive touch panel, such as a four-wire type, a five-wire type, or a seven-wire type touch panel.

As illustrated in FIG. 1, the touch panel 1 includes a transparent operation area 11 at the center of an upper electrode layer 2, and a frame 12 along the outer periphery of the upper electrode layer 2. A flexible printed circuit (FPC) 13 is connected to an external controller.

As illustrated in FIG. 2, control wiring and control wiring 33 are provided below the frame 12, and are connected to the FPC 13. In the touch panel 1, a lower electrode layer 3, an insulating layer 4, and the upper electrode layer 2 are stacked. The insulating layer 4 is provided between the upper electrode layer 2 and the lower electrode layer 3, and is formed in a frame-like shape along the outer periphery of the upper electrode layer 2. The insulating layer 4 includes an upper insulating layer 41, a double-sided adhesive layer 42, and a lower insulating layer 43.

The upper electrode layer 2 includes a film 21 (a first substrate), and a transparent conductive layer 22 (a first conductive layer) formed on the lower surface of the film 21. The lower electrode layer 3 includes a glass 31 (a second substrate), and a transparent conductive layer 32 (a second conductive layer) formed on the upper surface of the glass 31. The transparent conductive layer 22 and the transparent conductive layer 32 are disposed facing each other, with the insulating layer 4 being interposed therebetween. Materials of the transparent conductive layers 22 and 32 may be, for example, indium tin oxide (ITO).

In the present embodiment, a decorative layer 23 is provided on the lower surface of the conductive layer 22. The decorative layer 23 forms the frame 12 along the outer periphery of the conductive layer 22, and is formed of a conductive material. The decorative layer 23 is used to hide the frame 12, such that the wiring 24 and the wiring 33 cannot be seen from the outside.

The surface of the film 2 can be made smooth by forming the decorative layer 23 between the film 21 and the glass 31. Thus, while maintaining the surface smoothness of the film 21, it is also possible to improve the appearance of the touch panel 1 by making wiring invisible from the film 21 side. A stacked structure in which the decorative layer 23 is formed between the film 21 and the glass 31 is also referred to as a three-layer flush structure. In a touch panel with a three-layer flush structure, both electrical characteristics and black color decorative design are provided by the decorative layer 23 that is a carbon layer having conductivity.

The wiring 24 is provided on the lower side of the upper electrode layer 2. The wiring 24 is insulated from the lower electrode layer 3 by the upper insulating layer 41. The wiring 33 is provided on the upper side of the transparent conductive layer 32. The wiring 33 is insulated from the upper electrode layer 2 by the lower insulating layer 43.

The wiring 24 and the wiring 33 respectively electrically connect the upper electrode layer 2 and the lower electrode layer 3 to the FPC 13 or other external equipment.

The transparent conductive layer 22, the decorative layer 23, and the wiring 24 correspond to the first conductive layer formed on the surface of the film 21. The transparent conductive layer 32 and the wiring 33 correspond to the second conductive layer formed on the surface of the glass 31.

In the present embodiment, a through-hole 44 that penetrates the insulating layer 4 between the decorative layer 23 and the transparent conductive layer 32 is provided. The through-hole 44 releases static electricity which enters from an outer edge of the decorative layer 23 to the lower electrode layer 3. The through-hole 44 linearly extends from the decorative layer 23 to the transparent conductive layer 32, and is provided on an outer side relative to the wiring 24 and the wiring 33.

Figure 3A:
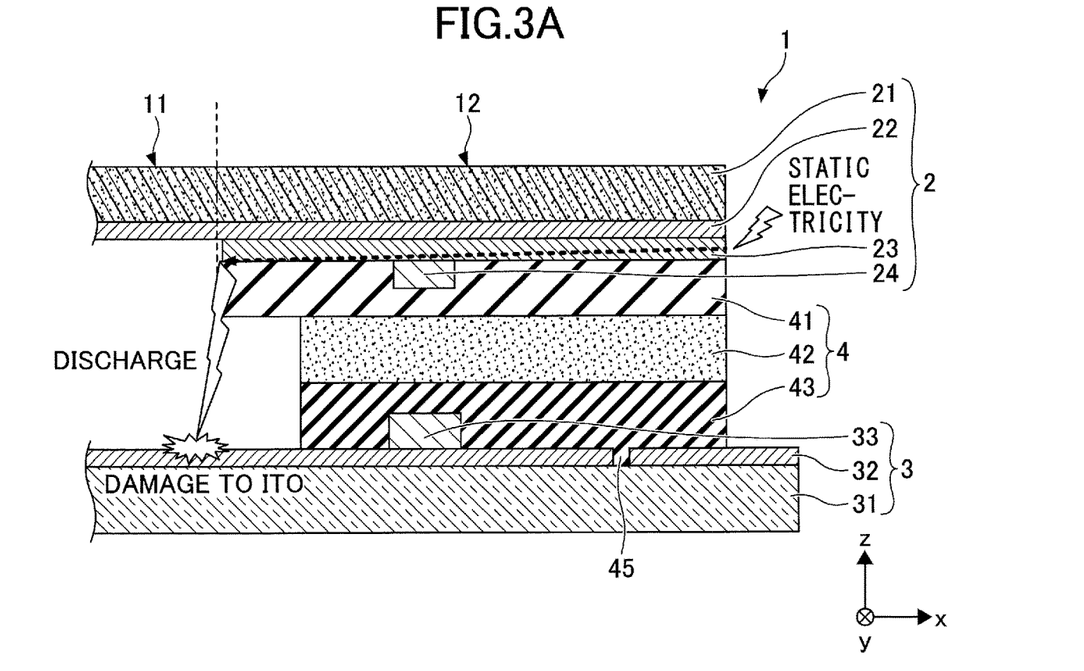
FIGS. 3A and 3B are schematic views illustrating an effect of a through-hole.
Figure 3B:
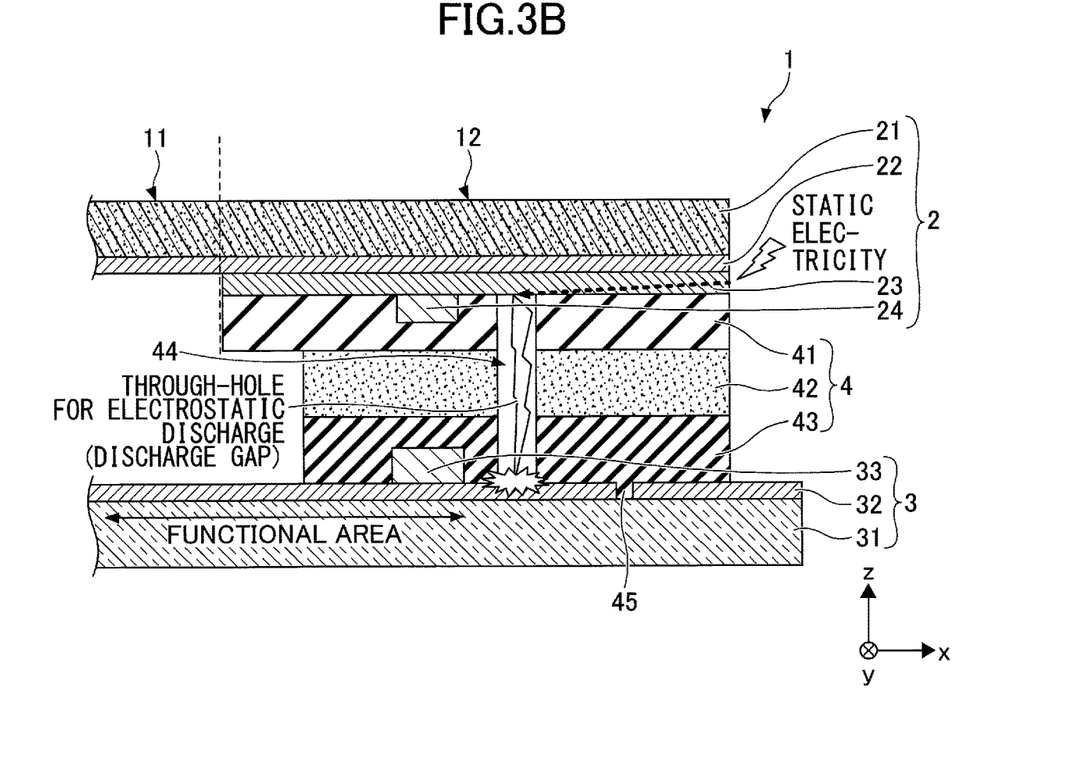

Referring to FIGS. 3A and 3B, an effect of a through-hole will be described. FIG. 3A is a diagram illustrating a comparative example of electrostatic discharge in a three-layer flush structure without a through-hole. FIG. 3B is a diagram illustrating an example of electrostatic discharge in a configuration with the through-hole 44 according to the embodiment.

If a through-hole is not provided as illustrated in FIG. 3A, the conductive decorative layer 23 is continuously provided between the inner side and the outer periphery. Thus, static electricity entering from an outer edge of the touch panel flows through the decorative layer 23, reaches the inner edge of the decorative layer 23 inside the touch panel, and is discharged to the transparent conductive layer 32. As a result, damage visually recognizable by an operator would be formed in the operation area 11 due to electrostatic discharge, thus resulting in deterioration of the appearance. Further, an internal circuit of the lower electrode layer 3 may be damaged.

Conversely, when the through-hole 44 is provided as illustrated in FIG. 3B, static electricity entering from an outer edge of the touch panel is discharged from the through-hole 44 to the transparent conductive layer 32. The static electricity discharged to the transparent conductive layer 32 flows to the FPC 13 through the wiring 33 which is conductively connected to the transparent conductive layer 32, and is released to the outside of the touch panel 1. With the above configuration, even if the transparent conductive layer 32 is damaged by electrostatic discharge, the damage is hidden by the decorative layer 23 and is not readily seen from the operator because the portion damaged by electrostatic discharge is located below the decorative layer 23.

The transparent conductive layer 32 is divided by a dividing portion 45 of the lower insulating layer 43 within a range of the frame 12, and the dividing portion 45 is situated between an inner side and an outer side of the touch panel 1. The dividing portion 45 may be formed by etching, for example. The through-hole 44 is provided on the inner side of the touch panel 1 relative to the dividing portion 45. Accordingly, static electricity discharged from the through-hole 44 to the transparent conductive layer 32 is readily led to the wiring 33 located on the inner side relative to the through-hole 44. Accordingly, static electricity can be safely discharged to a lower-layer area such as the wiring 33 before reaching the inside of the touch panel 1, thus preventing damage to the internal circuit of the lower electrode layer 3. According to the first embodiment, an effect of electrostatic discharge can be reduced by providing the through-hole 44.

Second Embodiment

Figure 4:
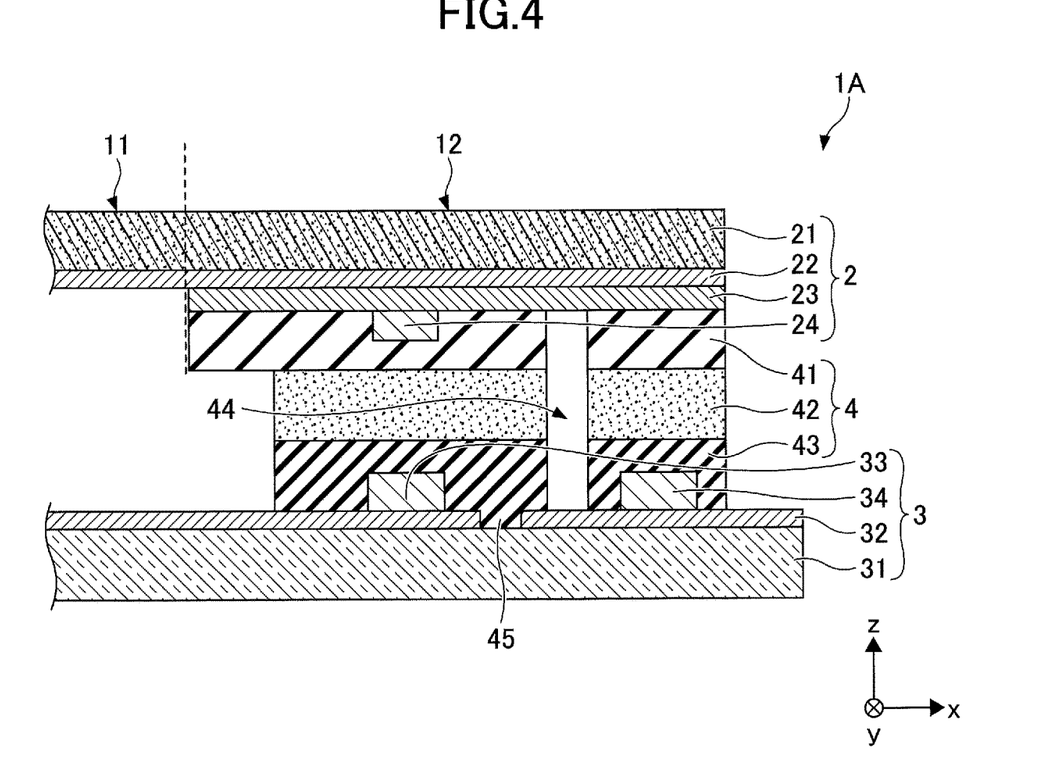
FIG. 4 is a cross-sectional view of a touch panel according to a second embodiment.

A second embodiment will be described with reference to FIG. 4. FIG. 4 is a cross-sectional view of a touch panel 1A according to the second embodiment. The cross-sectional view illustrated in FIG. 4 is taken through II-II of FIG. 1.

As illustrated in FIG. 4, a through-hole 44 is provided on the outer side of the touch panel relative to the dividing portion 45.

The lower electrode layer 3 includes the wiring 33 located on the inner side relative to the dividing portion 45 and is connected to the FPC 13, and also includes dummy wiring 34 located on the outer side of the touch panel 1 relative to the dividing portion 45 and is grounded.

In the touch panel 1A, static electricity entering from an outer edge is discharged from the through-hole 44 to the transparent conductive layer 32. A portion of the transparent conductive layer 32 to which static electricity is discharged is not electrically connected to the wiring 33 because the dividing portion 45 is provided therebetween. Thus, the static electricity does not flow toward the inside of the touch panel 1A, and flows through the dummy wiring 34 electrically connected to the through-hole 44 and is released to the outside.

In the second embodiment, the transparent conductive layer 32, the wiring 33, and the dummy wiring 34 correspond to the second conductive layer formed on the surface of the glass 31.

In the touch panel 1A, static electricity is discharged through the dummy wiring 34 instead of the wiring 33. Thus, the static electricity does not flow through the wiring 33 and the FPC 13, further reducing an effect of electrostatic discharge.

Third Embodiment

Figure 5:
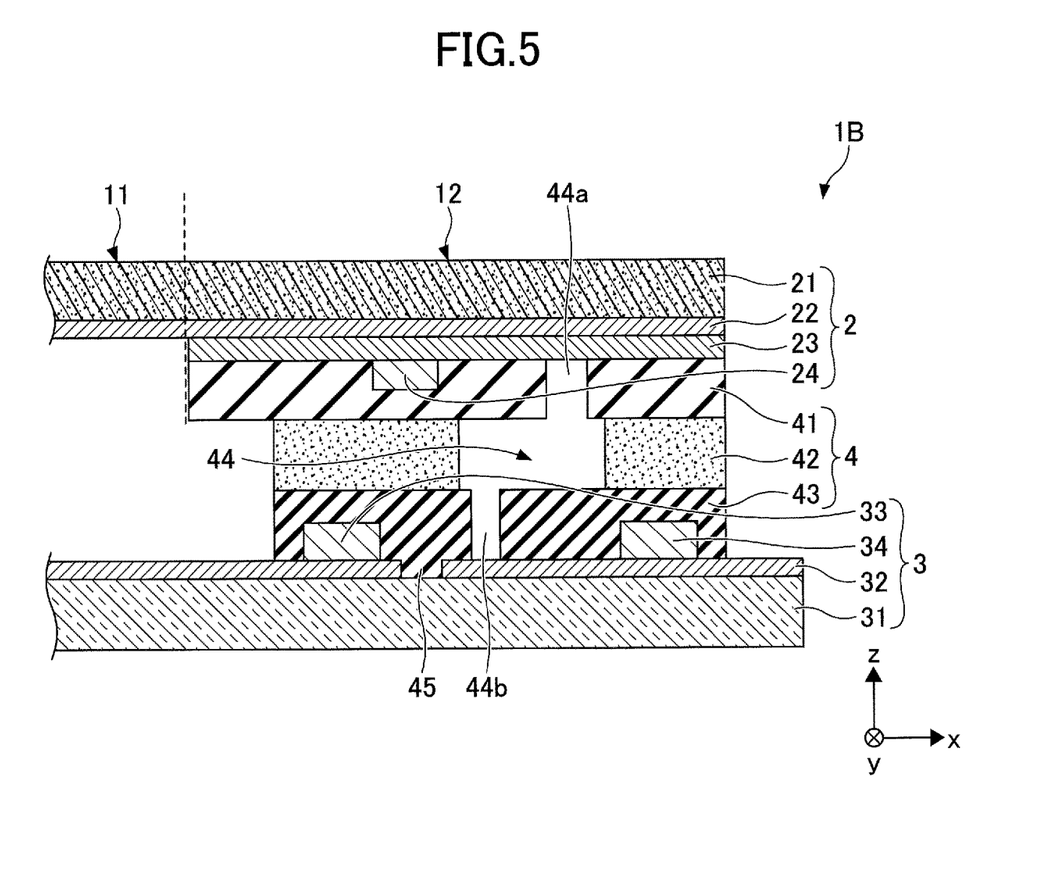
FIG. 5 is a cross-sectional view of a touch panel according to a third embodiment.

A third embodiment will be described with reference to FIG. 5. FIG. 5 is a cross-sectional view of a touch panel 1B according to the third embodiment. The cross-sectional view illustrated in FIG. 5 is taken through II-II of FIG. 1.

As illustrated in FIG. 5, a through-hole 44 includes through-holes 44a and 44b. The position of the through-hole 44a on the decorative layer 23 side offsets from the position of the through-hole 44b on the conductive layer 32 side. By offsetting the through-hole 44a from the position of the through-hole 44b, it is possible to prevent a short circuit between the transparent conductive layer 22 and the transparent conductive layer 32.

In the first embodiment, the transparent conductive layer 32 and the transparent conductive layer 22 are disposed facing each other with the through-hole 44 interposed therebetween. Under normal conditions, a space between the transparent conductive layer 32 and the transparent conductive layer 22 is maintained by the insulating layers 41 and 43 and the adhesive 42, and the transparent conductive layer 32 and the transparent conductive layer 22 do not contact each other. However, if the transparent conductive layer 22 uses a PET film as a base, the transparent conductive layer 22 may be deformed by pressure applied from the upper surface and would make contact with the transparent conductive layer 32. Conversely, in the third embodiment, even if the PET film is deformed by pressure applied from the upper surface, the through-hole 44 formed in a shape of FIG. 5 prevents contact between the transparent conductive layer 22 and the transparent conductive layer 32 because the insulating layer is located below the transparent conductive layer 22.

Fourth Embodiment

Figure 6:
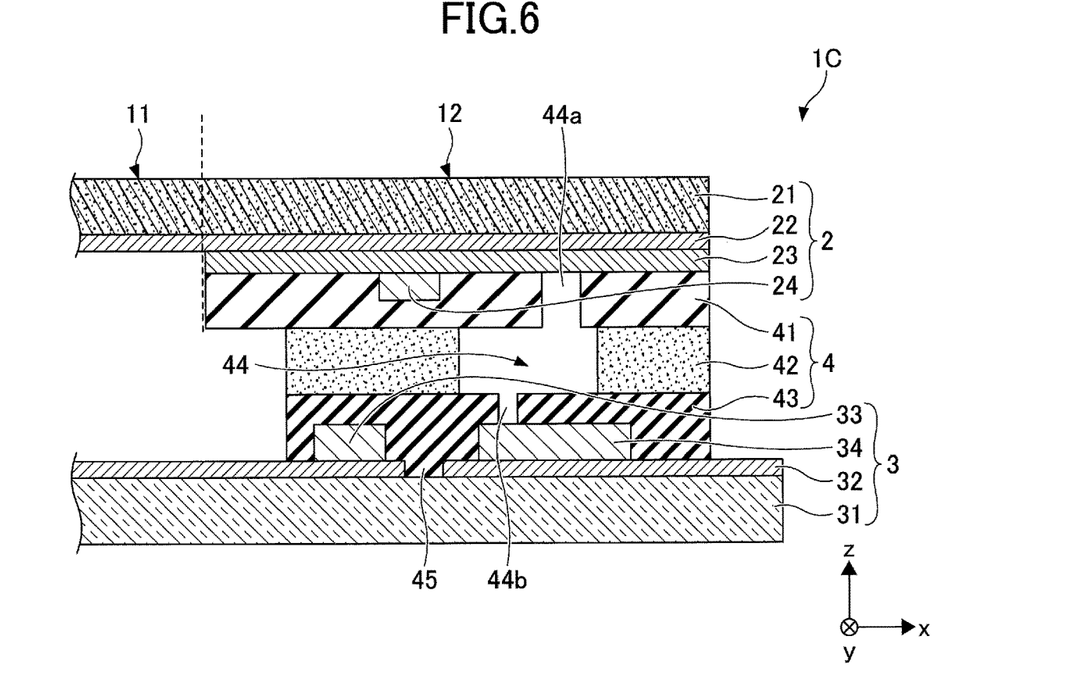
FIG. 6 is a cross-sectional view of a touch panel according to a fourth embodiment.

A fourth embodiment will be described with reference to FIG. 6. FIG. 6 is a cross-sectional view of a touch panel 1C according to the fourth embodiment. The cross-sectional view illustrated in FIG. 6 is taken through II-II of FIG. 1.

As illustrated in FIG. 6, a through-hole 44 extends from the decorative layer 23 to the dummy wiring 34.

In the touch panel 1C, static electricity entering from an outer edge of the panel is discharged from the through-hole 44 to the dummy wiring 34, flows through the dummy wiring 34, and is released to the outside. When the transparent conductive layer 32 receives static electricity flowing through the through-hole 44, the thin transparent conductive layer 32 might be damaged at a position where static electricity is discharged. Conversely, in the fourth embodiment, the dummy wiring 34 which is thicker and stronger than the transparent conductive layer 32 receives static electricity, thus preventing damage to the transparent conductive layer 32.

Fifth Embodiment

Figure 7:
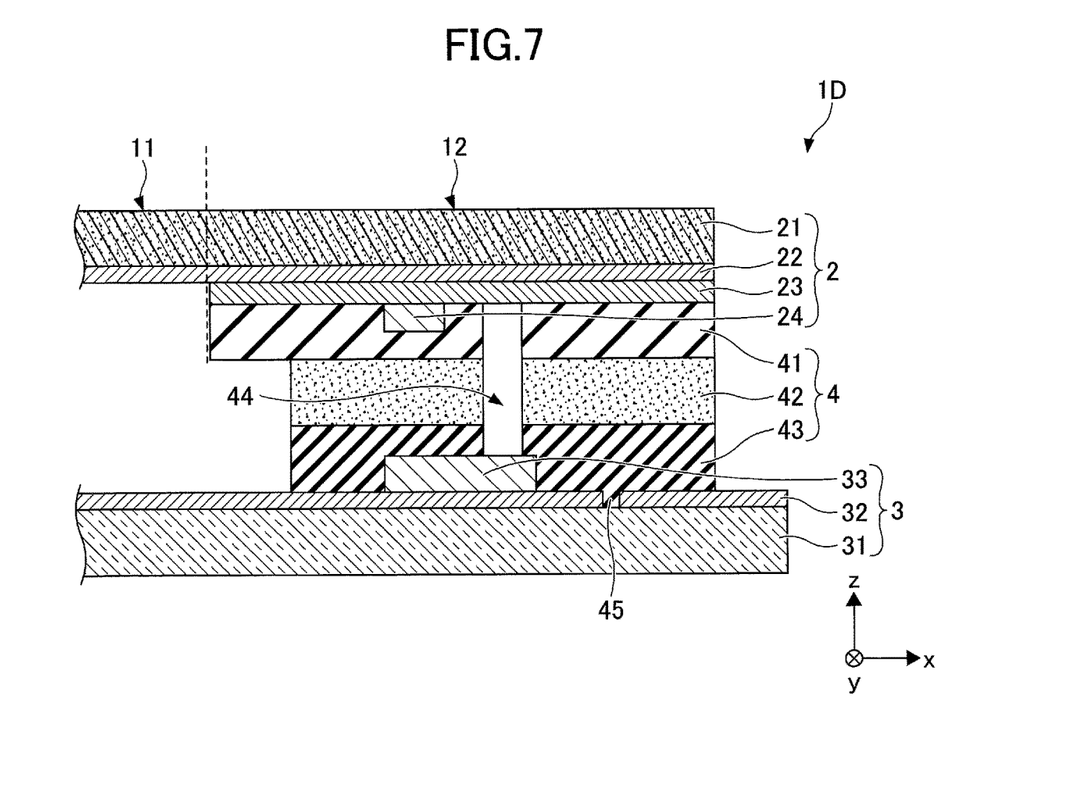
FIG. 7 is a cross-sectional view of a touch panel according to a fifth embodiment.

A fifth embodiment will be described with reference to FIG. 7. FIG. 7 is a cross-sectional view of a touch panel 1D according to the fifth embodiment. The cross-sectional view illustrated in FIG. 7 is taken through II-II of FIG. 1.

As illustrated in FIG. 7, a through-hole 44 extends from the decorative layer 23 to the wiring 33. The through-hole 44 is provided on the inner side of the touch panel 1 relative to the dividing portion 45.

In the touch panel 1D, static electricity entering from an outer edge of the panel is discharged from the through-hole 44 to the wiring 33, and is released through the wiring 33 to the outside. In the fifth embodiment, the wiring 33 thicker and stronger than the transparent conductive layer 32 receives static electricity, thus preventing damage to the transparent conductive layer 32, as with the fourth embodiment. Further, the wiring 33 is also used for electrostatic discharge. Therefore, the number of wires can be reduced as compared to the case that the dummy wiring is provided.

Figure 8A:
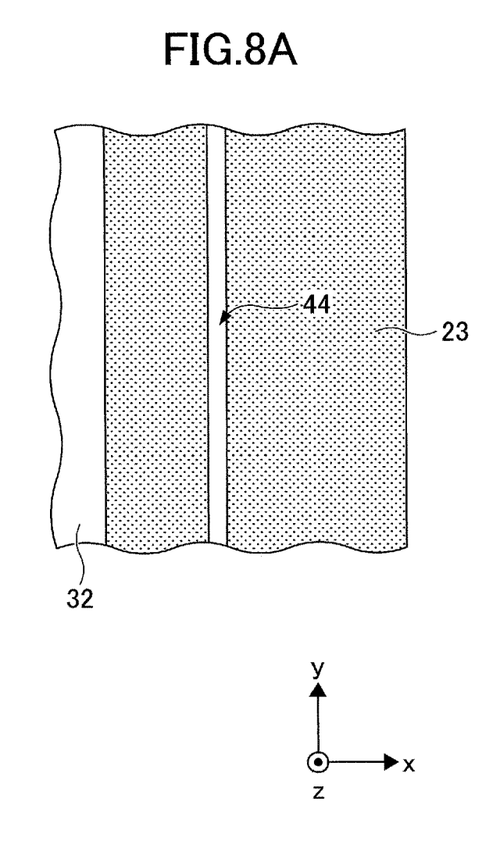
FIGS. 8A through 8C are schematic diagrams illustrating example patterns of shapes of through-holes in planar view.
Figure 8B:
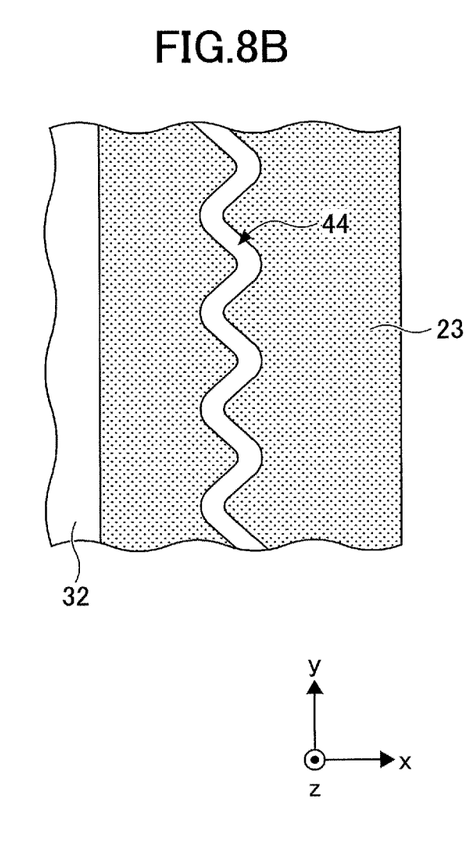
Figure 8C:
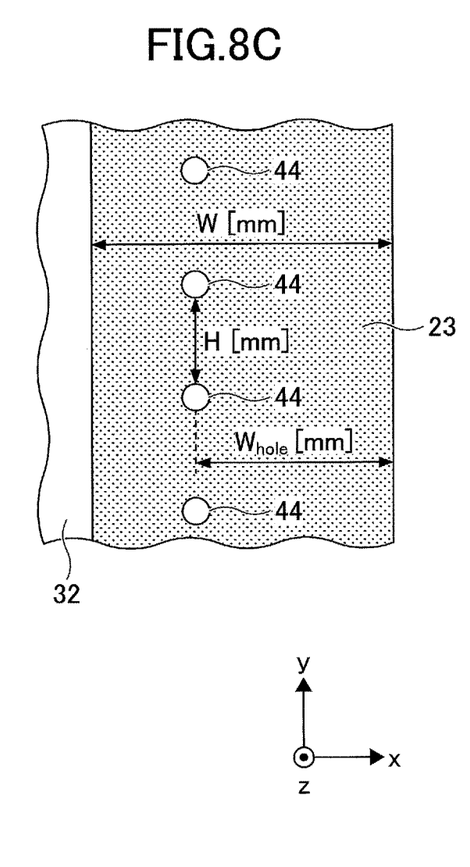
Figure 9:
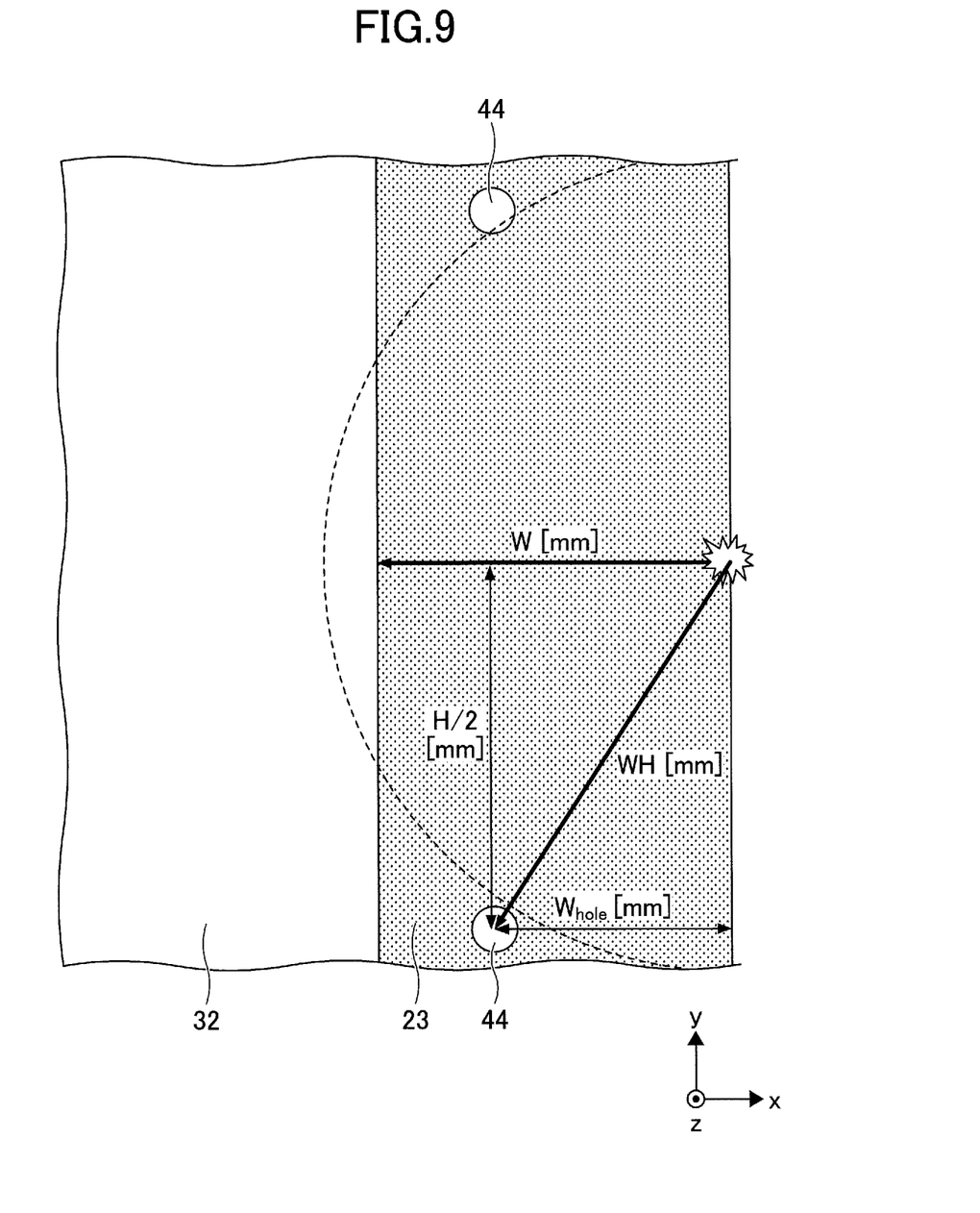
FIG. 9 is a diagram illustrating the relationship between transmission of static electricity and the position of a through-hole.

FIGS. 8A through 8C are schematic diagrams illustrating example patterns of through-holes. FIG. 9 is a diagram illustrating a relationship between transmission of static electricity and a position of a through-hole. In each of FIG. 8A through FIG. 9, a straight line on the right side indicates the outer periphery of the frame 12, and the top-bottom direction indicates a peripheral direction of the frame 12. A through-hole 44 of FIG. 8A is formed in a straight shape and is provided in the peripheral direction. A through-hole 44 of FIG. 8B is formed in a wavy shape and is provided in the peripheral direction. Through-holes 44 of FIG. 8C are arranged in the peripheral direction.

The holes are arranged at intervals H (mm) so as to satisfy a following formula (1).

$$H \leq 2 \times \sqrt{(W)^2 - (W_{hole})^2} \tag{1}$$

W represents a width (mm) of the frame 12, and $W_{hole}$ represents a distance (mm) from any of the holes 44 to the outer edge of the frame 12.

Referring to FIG. 9, the reason why the conditional formula (1) needs to be satisfied will be described.

As illustrated in FIG. 9, static electricity entering from an outer edge of the decorative layer 23 concentrically spreads with the entering position from which static electricity has entered as being the center. When a through-hole 44 connected to a conductive material such as the lower electrode layer 3 is located within the concentric circle, static electricity is discharged toward the conductive material. However, if the intervals H of through-holes 44 are large, a distance W from the entering position to the inner edge of the decorative layer 23 at which the conductive layer is exposed inside the touch panel becomes shorter than a distance WH from the entering position to the through-hole 44. In this case, the static electricity might be discharged within the touch panel.

The distance WH from the outer edge of the decorative layer 23 to the through-hole 44 is expressed by a formula (2):

$$WH = \sqrt{\left(\frac{H}{2}\right)^2 + W_{hole}^2} \tag{2}$$

Regardless of the position from which static electricity enters, it is possible to prevent the discharge of static electricity within the touch panel by setting the distance WH shorter than the distance W. This condition is expressed as a formula (3) below.

$$W \geq WH = \sqrt{\left(\frac{H}{2}\right)^2 + W_{hole}^2} \quad (3)$$

The formula (1) is obtained by solving the formula (3) for H.

In the structure of FIG. 8A with a straight through-hole 44, the through-hole can be formed even on a touch panel with a narrow frame 12. However, the adhesive 42 is also arranged along a straight line. As a result, a straight portion may appear as unevenness on the surface of the film 21, and the appearance would sometimes deteriorate.

In FIG. 8B, although a wider space is required for arranging the through-hole 44, unevenness of the surface of the film 21 can be minimized because the adhesive 42 is not arranged in a straight line.

In FIG. 8C, the through-holes are not continuously arranged. Accordingly, unlike FIG. 8B, the unevenness of the surface does not readily appear, and a wider space is not required.

Although the embodiments have been specifically described above, the present disclosure is not limited to the above-described embodiments. These embodiments may be modified by a person skilled in the art. Elements and their arrangement, conditions, and shapes are not limited to the above-described embodiments and may be modified as necessary. It should be noted that combination of the elements of the embodiments may be changed as long as no technical contradiction occurs.

What is claimed is:

1. A touch panel comprising:
a first substrate;
a second substrate disposed facing the first substrate;
a first conductive layer formed on one surface of the first substrate;
a second conductive layer formed on a surface of the second substrate that faces the first substrate;
an insulating layer disposed between the first conductive layer and the second conductive layer; and
a decorative layer disposed between the first conductive layer and the insulating layer and disposed along an outer periphery of the first substrate, the decorative layer being electrically conductive,
wherein a through-hole is formed within the insulating layer so as to extend from the decorative layer to the second conductive layer,
wherein the second conductive layer is divided by a dividing portion of the insulating layer within a range of the decorative layer, an inner side and an outer side of the touch panel being defined with respect to the dividing portion,
wherein the through-hole is disposed on the outer side of the touch panel with respect to the dividing portion, and
wherein the second conductive layer includes wiring that is disposed on the inner side of the touch panel with respect to the dividing portion, and also includes dummy wiring that is disposed on the outer side of the touch panel with respect to the dividing portion and is grounded.

2. A touch panel comprising:
a first substrate;
a second substrate disposed facing the first substrate;
a first conductive layer formed on one surface of the first substrate;
a second conductive layer formed on a surface of the second substrate that faces the first substrate;
an insulating layer disposed between the first conductive layer and the second conductive layer; and
a decorative layer disposed between the first conductive layer and the insulating layer and disposed along an outer periphery of the first substrate, the decorative layer being electrically conductive,
wherein a through-hole is formed within the insulating layer so as to extend from the decorative layer to the second conductive layer,
wherein the second conductive layer is divided by a dividing portion of the insulating layer within a range of the decorative layer, an inner side and an outer side of the touch panel being defined with respect to the dividing portion,
wherein the through-hole is disposed on the inner side of the touch panel with respect to the dividing portion, and
wherein the second conductive layer includes wiring that is disposed on the inner side of the touch panel with respect to the dividing portion.

3. A touch panel comprising:
a first substrate;
a second substrate disposed facing the first substrate;
a first conductive layer formed on one surface of the first substrate;
a second conductive layer formed on a surface of the second substrate that faces the first substrate;
an insulating layer disposed between the first conductive layer and the second conductive layer; and
a decorative layer disposed between the first conductive layer and the insulating layer and disposed along an outer periphery of the first substrate, the decorative layer being electrically conductive,
wherein a through-hole is formed within the insulating layer so as to extend from the decorative layer to the second conductive layer, and
wherein the through-hole includes a plurality of holes arranged in a peripheral direction of the decorative layer, and the plurality of holes are arranged at intervals H (mm) so as to satisfy a following formula:

$$H \leq 2 \times \sqrt{(W)^2 - (W_{hole})^2}$$

wherein W represents a width (mm) of the decorative layer and $W_{hole}$ represents a distance (mm) from any of the holes to an outer edge of the decorative layer.

4. A touch panel comprising:
a first substrate;
a second substrate disposed facing the first substrate;
a first conductive layer formed on one surface of the first substrate;
a second conductive layer formed on a surface of the second substrate that faces the first substrate;
an insulating layer disposed between the first conductive layer and the second conductive layer; and
a decorative layer disposed between the first conductive layer and the insulating layer and disposed along an outer periphery of the first substrate, the decorative layer being electrically conductive,
wherein a through-hole is formed within the insulating layer so as to extend from the decorative layer to the second conductive layer
wherein the second conductive layer is divided by a dividing portion of the insulating layer within a range of the decorative layer, an inner side and an outer side of the touch panel being defined with respect to the dividing portion, and
wherein the through-hole is provided at the inner side.

* * * * *